United States Patent Office 3,318,874
Patented May 9, 1967

3,318,874
BIS-(β-HYDROXYETHYLSULFONE-PHENYL-AMINO-TRIAZINE) STILBENES
Erich Schinzel, Frankfurt am Main, Rolf Austrup, Bad Soden, Taunus, and Karl Heinz Lebkücher, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Jan. 29, 1963, Ser. No. 254,566
Claims priority, application Germany, Feb. 1, 1962, F 35,895
12 Claims. (Cl. 260—240)

We have found that aminostilbene derivatives which contain an aminoaryl-β-hydroxyethylsulfone radical, if desired a substituted amino-β-hydroxyethylsulfone radical, bound at least once over a 1,3,5-triazine ring, are excellent optical brighteners.

Aminostilbene derivatives of the above-identified type are, for example, the compounds which correspond to the general formula

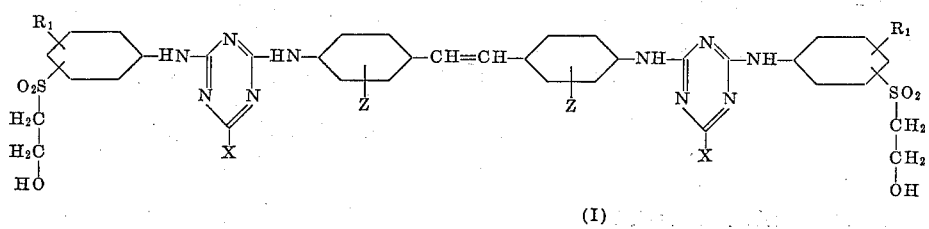

(I)

in which Z represents a SO₃Me group, Me being the equivalent of a cation capable of forming water-soluble salts, for example, an alkali metal, ammonia, or an amine, but preferably sodium metal, $R_1$ represents a hydrogen atom, a low molecular alkyl or alkoxy radical having up to 4 carbon atoms, and X represents a NH₂ group or the radical of an aliphatic primary or secondary amine having up to 4 carbon atoms, preferably an amine containing groups that impart solubility in water, for example, the radical of aliphatic aminocarboxylic acids or aminosulfonic acids such as glycocoll, sarcosine, taurine or methyltaurine.

Owing to the very brilliant white tint they give, to the great yield and good fastness to light, the novel aminostilbene derivatives are excellently suitable for the optical brightening of structures of any kind, for example, foils, films, felts or textile materials such as fibres, filaments, flocks, fabrics or knit fabrics made of native, regenerated or synthetic materials, as well as of leather and paper. Especially good brightening effects are obtained with structures made of native or regenerated cellulose. Compounds where X represents a taurine radical have a particularly good brightening action on polyamide materials.

The compounds of the present invention may be used as components in substance mixes of any kind for optical brightening, for example, in detergents, in rinsing or finishing agents, or they may be added to the materials to be brightened during production of these materials, Thus, they may be added to wash lyes, brightening baths, bleaching lyes, and also to paper pulp. Owing to the good yield, the compounds of the present invention may be used in the liquors or baths in relatively low concentrations. In general, they are applied in concentrations ranging from about 0.1% to about 0.6%, in special cases up to about 1%, referred to the weight of the goods.

A particular technical advantage of the novel aminostilbene derivatives is that they yield brilliant brightenings even in high concentrations and that extensive accumulations thereof on the structures to be brightened cause only a slight reduction of the fluorescent power. This property is very valuable for the use of the compounds in washing baths, because a reduction of the degree of white due to cumulation of the brightener is not to be feared even if the compounds are applied in great amounts and if the washing process is repeated several times.

A further noteworthy advantageous property possess those aminostilbene derivatives which contain aminoaryl-β-hydroxy-ethylsulfone radicals whose benzene nuclei are substituted by alkyl and alkoxy groups, the radicals being bound at least once over a 1,3,5-triazine ring; in addition to giving brilliant white tints, they exhibit a good resistance to acids and are compatible with catalysts for high quality finishes which, as is known, reduce the fluorescence power when applied together with the conventional products. Owing to these advantageous properties the novel products are valuable whitening agents in the paper industry and may also be used concurrently in high quality finishing processes in the textile industry.

The novel aminostilbene derivatives of the Formula I can be prepared by various known methods. For example, cyanuric acid chloride may be reacted, in any desired sequence, with an aminostilbene derivative, an aminoaryl-β-hydroxyethylsulfone or a substituted amino-aryl-β-hydroxyethylsulfone, and a primary or secondary aliphatic amine, preferably one containing solubilizing groups.

The condensation of 2 mols of cyanuric acid chloride with 1 mol of 4,4'-diaminostilbene-2,2'-disulfonic acid, 2 mols of an aminoaryl-β-hydroxyethylsulfone and 2 mols of a primary or secondary aliphatic amine having up to 4 carbon atoms and containing groups that impart solubility is of particular interest for the industry.

As aminoaryl-β-hydroxyethylsulfone, there may be used, for example, 4-aminophenyl-β-hydroxyethylsulfone, 3-aminophenyl-β-hydroxyethylsulfone, 3-amino-4-methylphenyl-β-hydroxyethylsulfone, 3-amino-6 - methylphenyl-β-hydroxyethylsulfone, and 3-amino-4-methoxyphenyl-β-hydroxyethylsulfone.

As primary or secondary aliphatic amines having up to 4 carbon atoms, preferably those which contain one group imparting solubility, for example, a carboxylic acid group or a sulfonic acid group, and preferably up to 4 carbon atoms, there are mentioned, in addition to ammonia, the following amines: methylamine, ethylamine, isopropylamine, butylamine, dimethylamine, diethylamine, monoethanolamine, diethanolamine, and, preferably, glycocoll, sarcosine, taurine and methyltaurine.

The reaction of cyanuric acid chloride mentioned above is carried out preferably in an aqueous or in an organic medium. For this purpose, one may use inert organic solvents and/or diluents, especially those which are miscible with water, for example, acetone, dioxane, dimethylsulfoxide or dimethyl formamide; they may be used alone or in admixture with one another or with water. The hydrochloric acid which is liberated during the course of the reaction is neutralized by adding agents having an alkaline action, for example, sodium carbonate, sodium bicarbonate, or dilute aqueous sodium hydroxide or potassium hydroxide solutions, or it is bound by adding agents binding mineral acid, for example, salts of weak acids and strong bases, for example, sodium acetate or an excess quantity of an organic amino compound. For preparing the primary condensation products of the cyanuric acid chloride, it is advantageous to use low temperatures, for example, temperatures in the range from 0 to +10° C. The compounds obtained are then reacted at a slightly elevated temperature, for example, a temperature in the range of 10° C. and 40° C. to form secondary condensation products which eventually yield at a higher temperature for example, at a temperature in the range of 60° C. and 100° C., the desired tertiary condensation products.

The following examples illustrate the invention but they are not intended to limit it thereto, the parts and percentages being by weight unless otherwise stated.

*Example 1*

A bleached cotton fabric was treated for 20 minutes at 40° C. with an aqueous bath containing 0.2% of the compound of the Formula II (referred to the weight of the goods)

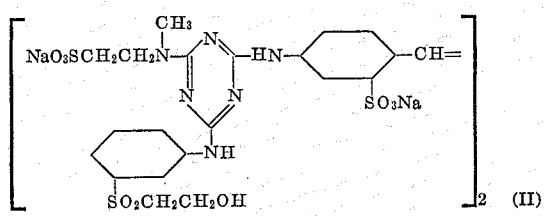

After rinsing and drying, the cotton fabric so treated exhibited a more beautiful white tint than an untreated fabric.

The compound of the Formula II was prepared as follows:

A solution of 18.4 parts of cyanuric acid chloride in 100 parts of acetone was allowed to run into a mixture of 300 parts of ice and 500 parts of water, while cooling. A solution of 20.7 parts of the sodium salt of 4,4'-diaminostilbene-2,2'-disulfonic acid in 150 parts of water was then introduced dropwise into this mixture at a temperature in the range of 0 and 5° C. and the reaction mixture was kept weakly acid to Congo paper by adding a soda solution of 10% strength. Stirring was continued at 0 to 5° C. until no primary aromatic amino group was detectable on diazotization.

To the eluate of 4,4'-bis-(2″,4″-dichlorotriazinyl-(6″)-amino)-stilbene-2,2'-disulfonic acid thus obtained, a solution of 20.1 parts of 3-aminophenyl-β-hydroxyethylsulfone in 200 parts of water was added dropwise at 5° C. to 10° C., while keeping the mixture neutral by simultaneously and dropwise adding a soda solution of 10% strength. The temperature was then raised to 35° C. to 40° C. while maintaining the neutral reaction and stirring was continued at this temperature until no primary aromatic amino groups could be detected by diazotization.

A solution of 62.4 parts of N-methyltaurine (66.8% strength) in 150 parts of water was run into the eluate of the sodium salt of 4,4'-bis-[2″-chloro-4″-(3‴-β-hydroxyethylsulfonylphenylamino)-triazinyl - (6″) - amino]-stilbene-2,2'-disulfonic acid thus obtained and the whole was heated to 95° C., while acetone was distilling off. The temperature was kept at 98° C. to 100° C. for 5 hours, the mixture was filtered and the reaction product was caused to crystallize by cooling and by adding 15% of NaCl. After having washed with a 15% NaCl solution until neutral, the brightener II was dried under reduced pressure, at a temperature of 60° C.

Instead of compound II, the compounds III through XII specified hereunder may be used with equal success.

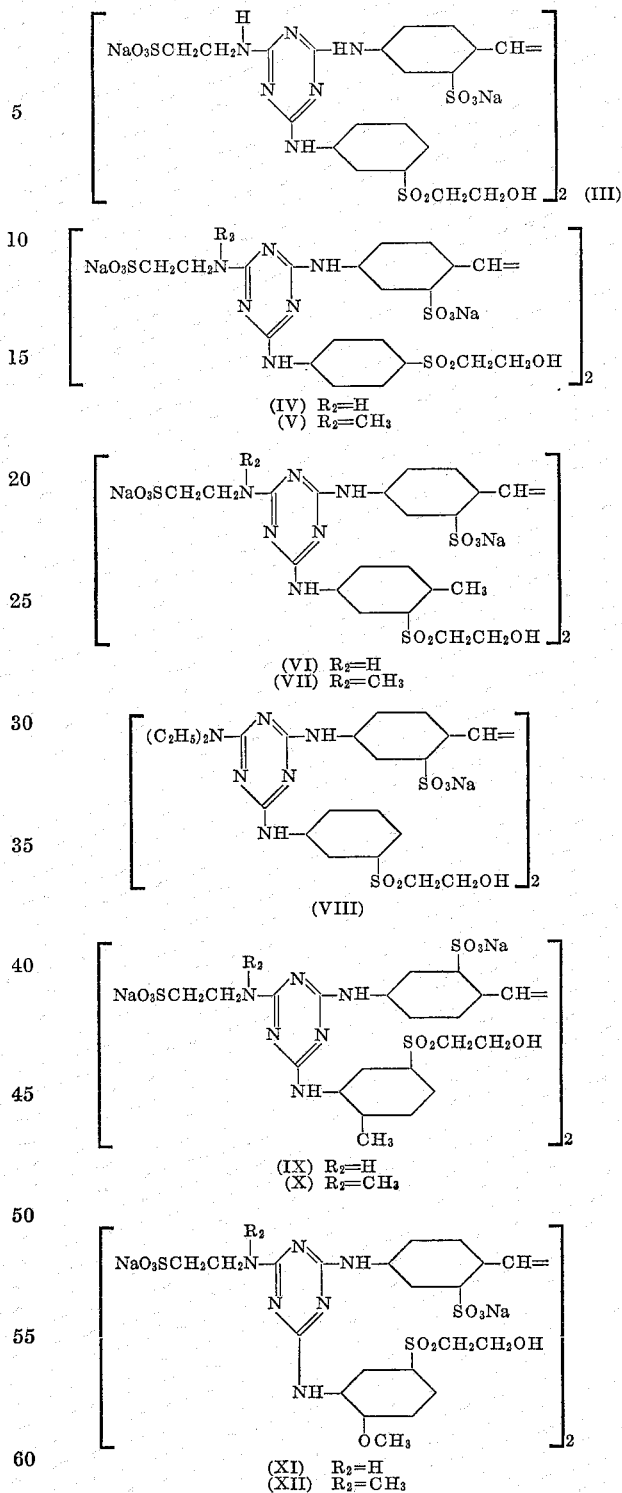

The compounds III through XII can be prepared in a manner similar to that used for preparing compound II.

*Example 2*

A desized crude cotton fabric was bleached for 3 hours at 85° C. and at a goods-to-liquor ratio of 1:20 with a solution that contained per liter 2 g. of sodium silicate, 1 g. of sodium hydroxide solution, 0.5 g. of alkylaryl sulfonate, 2 cc. of a hydrogen peroxide solution of 35% strength, and 0.2 g. of compound V. After rinsing and drying, the fabric exhibited an excellent white tint which could not be reached without the use of an optical brightener.

5

The determination of the degree of white effected with a Zeiss Elrepho apparatus gave a value of 98%, compared to magnesium oxide as the standard at a wave length of 460 mμ.

Example 3

0.2% (referred to the weight of the goods) of the amino-stilbene derivative of the Formula II was added to a sulfite pulp. The paper prepared thereof in the usual manner showed a brilliant white tint (Zeiss Elrepho value: 100.3%).

Example 4

A fabric made of polycaprolactam was treated for 20 minutes at 60° C. and at a goods-to-liquor of 1:20 with a solution containing per liter 0.5 cc. of formic acid of 85% strength and 0.2 g. of compound II. The degree of white tint was improved from 76% (crude fabric) to 87%.

Example 5

A detergent having the following composition was prepared and sprayed at 250° C.

| | Percent |
|---|---|
| Condensation product of oleyl alcohol and about 10 mols of ethylene oxide | 10 |
| Polyphosphate | 35 |
| Soap powder | 2 |
| Sodium metasilicate | 15 |
| Sodium perborate | 10 |
| Magnesium silicate | 3 |
| Carboxymethylcellulose | 3.5 |
| Compound II | 0.05 |
| Conventional filler | 21.45 |

White cotton poplin shirts were washed several times with this detergent in a drum washing machine. Even after 40 washes, the shirts showed no signs of brightener accumulations but a pure white.

Example 6

A bleached nettle was treated with a bath containing per liter 50 g. of polyvinylacetate dispersion and 3.2 g. of compound IX. The nettle was then squeezed to a 100% liquor absorption and dried. The fabric showed no yellowing but an intense and brilliant white tint.

Example 7

A bleached wool flannel which showed a slight yellowish tint was treated for 30 minutes at 45° C. and at a goods-to-liquor ratio of 1:20 with a solution containing per liter 0.5 cc. of formic acid of 85% strength and 0.2 g. of compound II. The degree of white was considerably improved by this treatment.

Example 8

For a high quality finish, a bleached cotton poplin was impregnated with a urea-formaldehyde precondensation product and ammonium nitrate. The solution also contained per liter 1.5 g. of compound II. The fabric was squeezed to a liquor absorption of 100% and the condensation of the resin was then completed at 150° C. There was obtained a brilliant bluish white and a good resistance to creasing.

We claim:

1. Aminostilbene derivative of the general formula

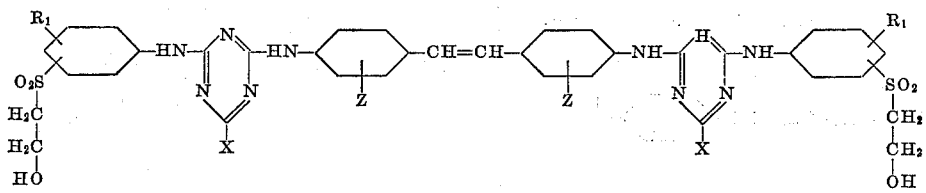

in which Z stands for a —$SO_3Me$ group, Me being the equivalent of a cation capable of forming water-soluble salts, $R_1$ represents a member selected from the group of (a) hydrogen, (b) a low molecular alkyl radical having up to 4 carbon atoms, and (c) a low molecular alkoxy radical having up to 4 carbon atoms, and X represents a member selected from the group consisting of (d) $NH_2$, (e) a radical of a saturated aliphatic primary amine having up to 4 carbon atoms, and (f) a radical of a saturated aliphatic secondary amine having up to 4 carbon atoms.

2. The aminostilbene compound of the formula

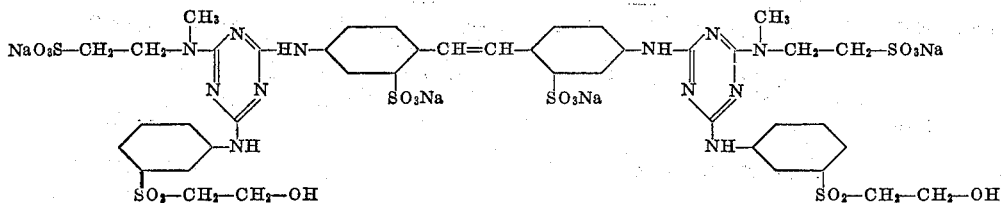

3. The aminostilbene compound of the formula

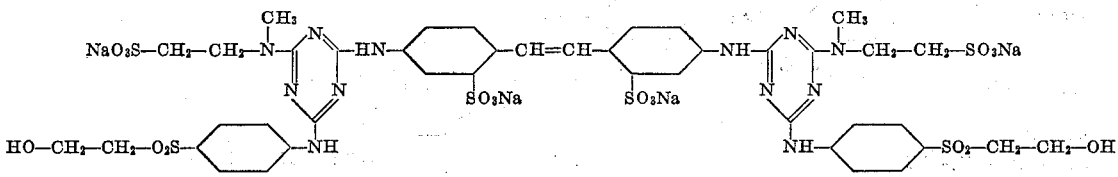

4. The aminostilbene compound of the formula
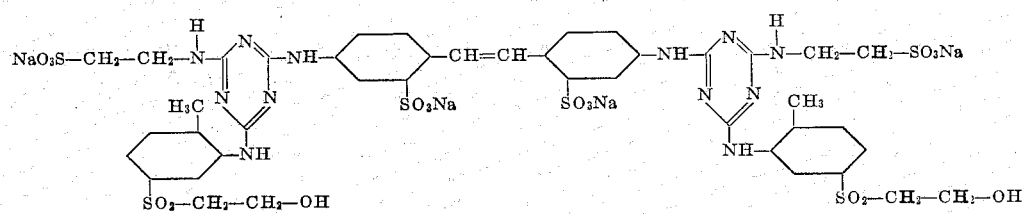
5. The aminostilbene compound of the formula
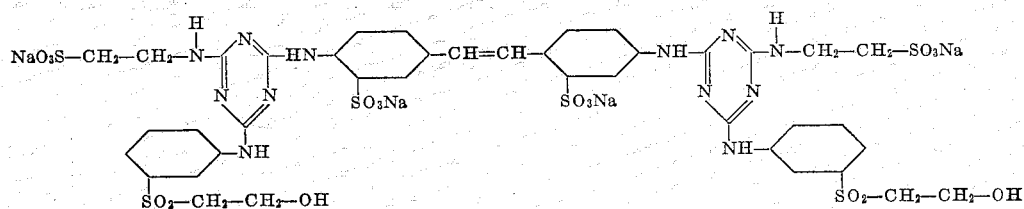
6. The aminostilbene compound of the formula
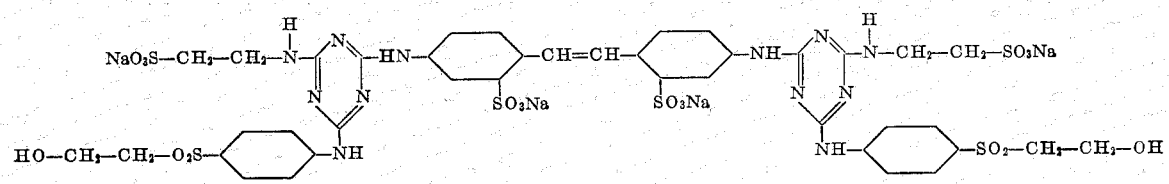
7. The aminostilbene compound of the formula
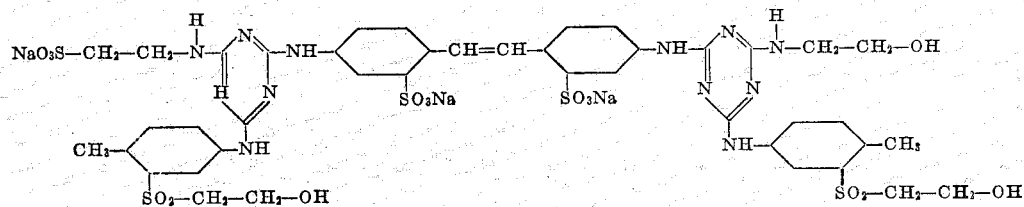
8. The aminostilbene compound of the formula
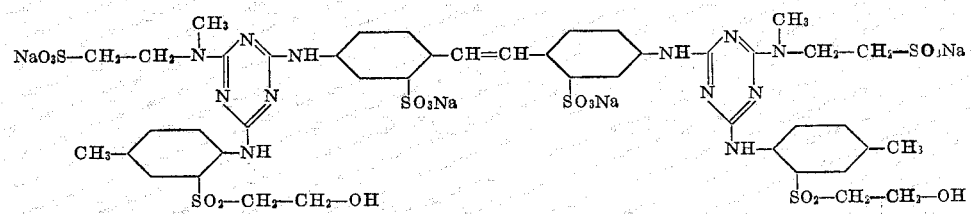
9. The aminostilbene compound of the formula
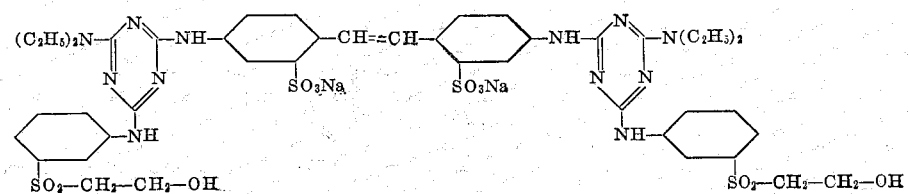

10. The aminostilbene compound of the formula
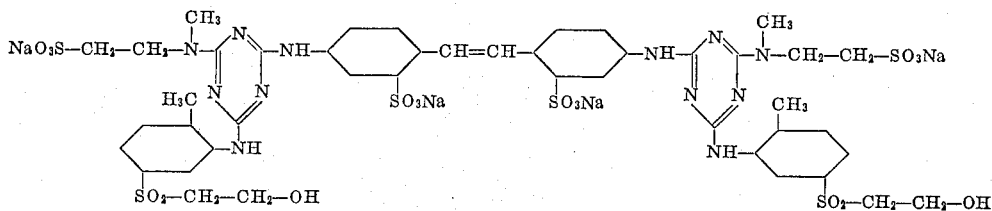
11. The aminostilbene compound of the formula
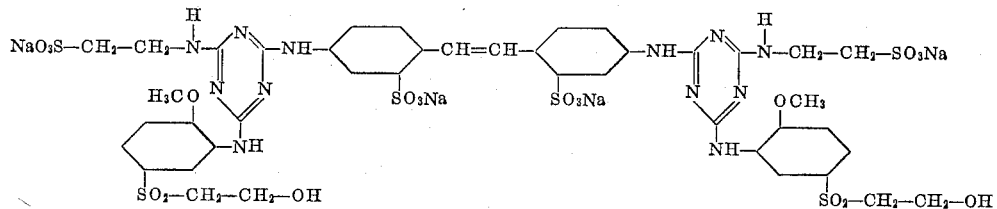
12. The aminostilbene compound of the formula
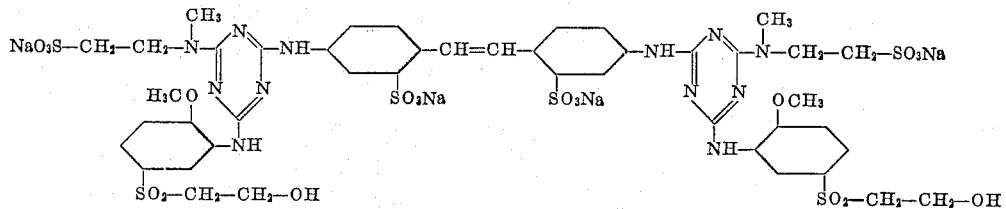
References Cited by the Examiner
UNITED STATES PATENTS
| | | | |
|---|---|---|---|
| 2,376,743 | 5/1945 | Wendt | 106—162 |
| 2,399,066 | 4/1946 | Schmid et al. | 260—152 |
| 2,945,762 | 7/1960 | Carroll et al. | 96—100 |
| 3,018,287 | 1/1962 | Fleck | 260—240 |
| 3,031,326 | 4/1962 | Fleck | 117—33.5 |
FOREIGN PATENTS
1,317,693   1/1963   France.
JOHN D. RANDOLPH, *Primary Examiner.*